Patented Oct. 23, 1934

1,977,633

UNITED STATES PATENT OFFICE 1,977,633

PROCESS FOR PRODUCING ALCOHOLS

George Frederick Horsley, Norton-on-Tees, England, assignor to Imperial Chemical Industries Limited, a corporation of Great Britain No Drawing. Application December 15, 1931, Serial No. 581,277. In Great Britain December 15, 1930

24 Claims. (Cl. 260—156)

This invention relates to the production of alcohols by catalytic hydration of the corresponding olefines and in particular to new catalysts for use therein.

It has already been proposed to prepare ethyl alcohol by heating ethylene and water under pressure, and in the presence of inorganic salts with an affinity for ethylene, e. g., mercuric chloride. It has also been proposed to prepare ethyl alcohol by treating ethylene with steam at an elevated temperature and under pressure in the presence of a hydrating catalyst, e. g., thoria or phosphoric acid deposited on charcoal. Further, it has been proposed to prepare alcohols by combining one or more olefines with water in the vapor state, at a temperature of at least 100° C. and in the presence of a metal of the platinum group, or gold, silver, copper, iron, cobalt, nickel, chromium, tantalum, vanadium, tungsten, molybdenum, or manganese, or salts or compounds thereof.

According to the present invention, in the catalytic hydration of olefines to produce the corresponding alcohols, a catalyst is employed consisting of or comprising a compound or compounds of beryllium, zinc, or cadmium. Among the compounds suitable for this purpose I include especially water-soluble salts the aqueous solutions of which are weakly acid, e. g., acid phosphates. The new catalysts may, if desired, be employed in conjunction with known catalysts, and/or in association with supports or carriers of an inert nature, e. g., pumice or asbestos.

In practicing the invention the reaction may be carried out in either the liquid or the vapor phase, and at ordinary or increased pressure, the reaction temperature being preferably 100°–300° C. Thus, when working in the liquid phase, the olefine gas may be compressed to say 100 atmospheres and brought into contact, e. g., in a counter-current packed tower, with an aqueous solution of a catalyst salt to which is added sufficient of the corresponding acid to prevent hydrolysis of the salt, at a temperature of 100°–300° C. When working in the vapor phase it is preferred to employ a large excess of olefine relative to water vapor, the gaseous reaction products being cooled to separate an aqueous solution of the alcohol which is formed and the surplus ethylene being circulated.

Example 1

A catalyst was prepared by heating one molecular equivalent of cadmium oxide with two molecular equivalents of phosphoric acid in aqueous solution, the mixture being evaporated to dryness at a temperature of about 130° C. and the product made into small pellets. Over the catalyst thus obtained was passed a mixture of three volumes of ethylene and one volume of steam, at the ordinary pressure and at a temperature of 200° C., the time of contact of the gases with the catalyst being 0.6 minutes. The gaseous products were cooled to the ordinary temperature and the aqueous condensate collected. This condensate contained 3.6 per cent by weight of ethyl alcohol, representing a conversion of ethylene of 0.5 per cent.

The activity of the above-described catalyst could be increased to some extent by prolonged heating in a closed vessel at a temperature of 130° C. prior to use in the process.

Example 2

The same catalyst was employed as in Example 1, and a mixture of equal volumes of ethylene and steam, at the ordinary pressure, was passed thereover at a temperature of 100° C. and with a contact time of 0.4 minutes. A conversion of 1 per cent of the ethylene was obtained.

The above examples are to be taken as illustrative only, and not as limiting the scope of the invention. The cadmium salt prepared according to Example 1 may be substituted by a beryllium or zinc salt prepared in a similar manner. Although the preferred range of temperature has already been stated, it will be understood that other temperatures suitable for effecting the same results and which vary from the range already given may be used in lieu thereof. Pressures of atmospheric and above are suitable, pressures up to and above 100 atmospheres being satisfactory. The specific examples refer particularly to the treatment of ethylene by catalytic hydration to produce ethyl alcohol. Other olefines, for example, propylene and butylene, which, in addition to ethylene, are the normally gaseous olefines, are susceptible of treatment in the same way.

Any modification or variation from the above description and examples which conforms to the spirit of the invention is intended to be included within the scope of the claims.

I claim:

1. The process of preparing alcohols which comprises reacting an olefine and water in the presence of a hydrating catalyst taken from the group consisting of phosphates or beryllium, cadmium and zinc.

2. The process of claim 1 in which the reaction is carried on in the liquid phase.

3. The process of claim 1 in which the reaction is carried on in the vapor phase.

4. The process of claim 1 in which the reaction is carried out at a temperature of 100°–300° C.

5. The process of claim 1 in which the reaction is carried out at atmospheric pressure.

6. The process of claim 1 in which the reaction is carried out at superatmospheric pressure.

7. The process of claim 1 in which the ratio of olefine to water is at least 1:1.

8. The process of claim 1 in which the olefine is a normally gaseous olefine.

9. The process of claim 1 in which the olefine is a normally gaseous olefine, and the phosphates are acid phosphates.

10. The process of claim 1 in which the olefine is propylene.

11. The process of claim 1 in which the olefine is butylene.

12. The process of preparing alcohols which comprises reacting an olefine and water in the presence of a hydrating catalyst taken from the group consisting of acid phosphates of beryllium, cadmium and zinc.

13. The process of preparing alcohols which comprises reacting ethylene and water in the presence of a hydrating catalyst taken from the group consisting of phosphates of berryllium, cadmium and zinc.

14. The process of preparing alcohols which comprises reacting ethylene and water in the presence of a hydrating catalyst taken from the group consisting of acid phosphates of berryllium, cadmium and zinc.

15. The process of preparing alcohols which comprises reacting an olefine and water in the presence of a cadmium phosphate.

16. The process of claim 15 in which the olefine is a normally gaseous olefine.

17. The process of claim 15 in which the reaction is carried on in the liquid phase.

18. The process of claim 15 in which the reaction is carried on in the vapor phase.

19. The process of claim 15 in which the reaction is carried out at a temperature of 100°–300° C.

20. The process of claim 15 in which the reaction is carried out at atmospheric pressure.

21. The process of claim 15 in which the reaction is carried out at superatmospheric pressure.

22. The process of claim 15 in which the ratio of olefine to water is at least 1:1.

23. The process of claim 15 in which the olefine is ethylene.

24. The process of preparing ethyl alcohol which comprises reacting ethylene and steam at atmospheric pressure and at a temperature of 200° C. in the presence of a catalyst prepared by reacting one chemical equivalent of cadmium oxide with two chemical equivalents of phosphoric acid in aqueous solution, and drying the mixture.

GEORGE FREDERICK HORSLEY.